(12) United States Patent
Zhao et al.

(10) Patent No.: US 9,098,789 B2
(45) Date of Patent: Aug. 4, 2015

(54) RFID COMMUNICATION CIRCUIT FOR AN ELECTRONIC DEVICE AND CORRESPONDING METHODS

(71) Applicant: Google Technology Holdings LLC, Mountain View, CA (US)

(72) Inventors: Hong Zhao, Naperville, IL (US); Eric L. Krenz, Crystal Lake, IL (US); Pavel A. Shostak, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 178 days.

(21) Appl. No.: 13/759,406

(22) Filed: Feb. 5, 2013

(65) Prior Publication Data

US 2014/0218177 A1    Aug. 7, 2014

(51) Int. Cl.
*H04Q 5/22* (2006.01)
*G06K 19/07* (2006.01)
*H04B 1/18* (2006.01)
*H04B 1/3805* (2015.01)

(52) U.S. Cl.
CPC ............. *G06K 19/0723* (2013.01); *H04B 1/18* (2013.01); *H04B 1/3805* (2013.01)

(58) Field of Classification Search
CPC .................................................... H04B 7/0817
USPC ..................... 340/10.5, 10.1, 572.1; 370/277; 455/556.1, 82
See application file for complete search history.

(56) References Cited

U.S. PATENT DOCUMENTS

| | | | |
|---|---|---|---|
| 6,177,860 B1 | 1/2001 | Cromer et al. | |
| 6,826,762 B2 | 11/2004 | Shell et al. | |
| 7,536,155 B2 | 5/2009 | Forster et al. | |
| 7,605,701 B2 * | 10/2009 | Lee ........................... | 340/572.1 |
| 7,706,834 B2 | 4/2010 | Kim et al. | |
| 8,284,055 B2 | 10/2012 | Butler et al. | |
| 8,463,192 B2 | 6/2013 | Yun et al. | |
| 2007/0030124 A1 | 2/2007 | Lee | |
| 2010/0302006 A1 | 12/2010 | Subramanian | |

FOREIGN PATENT DOCUMENTS

| | | |
|---|---|---|
| EP | 1780899 A2 | 5/2007 |
| EP | 1796208 A1 | 6/2007 |

OTHER PUBLICATIONS

Patent Cooperation Treaty, International Search Report and Written Opinion of the International Searching Authority for International Application No. PCT/US2014/011971, Mar. 27, 2014, 8 pages.

(Continued)

*Primary Examiner* — Toan N Pham
(74) *Attorney, Agent, or Firm* — Faegre Baker Daniels LLP

(57) ABSTRACT

An electronic device (200) includes a single antenna (211), a communication circuit (202), and a RFID circuit (207). A switch (212) selectively couples the single antenna to one of the communication circuit or the RFID circuit. For example, the RFID circuit can be coupled to the single antenna when the electronic device is OFF, and the communication circuit can be coupled to the single antenna when the electronic device is ON. Accordingly, RFID information can be received from an RFID communication device when the electronic device is OFF. When the electronic device is ON, an interrupt can cause the switch to connect the RFID circuit to the single antenna, sometimes only for less than a predetermined duration.

20 Claims, 7 Drawing Sheets

(56) References Cited

OTHER PUBLICATIONS

MPINJ Monza® X-2K and X-8K Dura Chips Deliver Exciting New Benefits to Manufacturers of Consumer Electronics, http://www.impinj.com/News_and_Events/Press_Releases/2012/Impinj_Monza_X-2K_and_X-8K_Dura_Chips_Deliver_Exciting_New_Benefits_to_Manufacturers_of_Consumer_Electronics.aspx, May 23, 2012, all pages.

RFID Business Applications, http://www.rfidjournal.com/article/articleprint/1334/-1/1, Oct. 28, 2012, all pages.

Fast and Secure Service With RFID-Tagged Phones, http://www.smartrac-group.com/en/success-stories-fast-and-secure-service-with-rfid-tagged-phones.php, Oct. 28, 2012, all pages.

Bernd Schoner, Embedded RFID: Why we got excited about passive RFID in the first place!, http://rfid.thingmagic.com/rfid-blog/?month=10&year=2012, Oct. 24, 2012, all pages.

* cited by examiner

RFID COMMUNICATION CIRCUIT FOR AN ELECTRONIC DEVICE AND CORRESPONDING METHODS

BACKGROUND

1. Technical Field

This invention relates generally to electronic devices, and more particularly to circuits of electronic devices.

2. Background Art

Electronic devices configured for communication, such as mobile telephones, tablet computers, and radios, each use antennas to transmit and receive radio-frequency communication signals. These antennas communicate with networks to transmit and receive data. The antennas allow the device to be truly wireless, in that all communication may occur through the air.

While once large, retractable devices, the antennas found on most common communication devices are quite small today. For example, at one time a mobile telephone was a relatively large device with a long, floppy, protruding antenna. Due to advances in technology, modern mobile telephones are slimmer and lighter. Antenna design has advanced to the point that many modern mobile telephones do not include protruding antennas at all. They rather rely upon internal antenna structures for communication with networks. The use of internal antennas has allowed designers and engineers to create sleeker and more fashionable products.

At the same time, the number of networks with which an electronic device must communicate has increased. This has increased the complexity of the circuitry of electronic devices. It would be advantageous to have an electronic device with simplified circuits without sacrificing device functionality.

Figure 1:
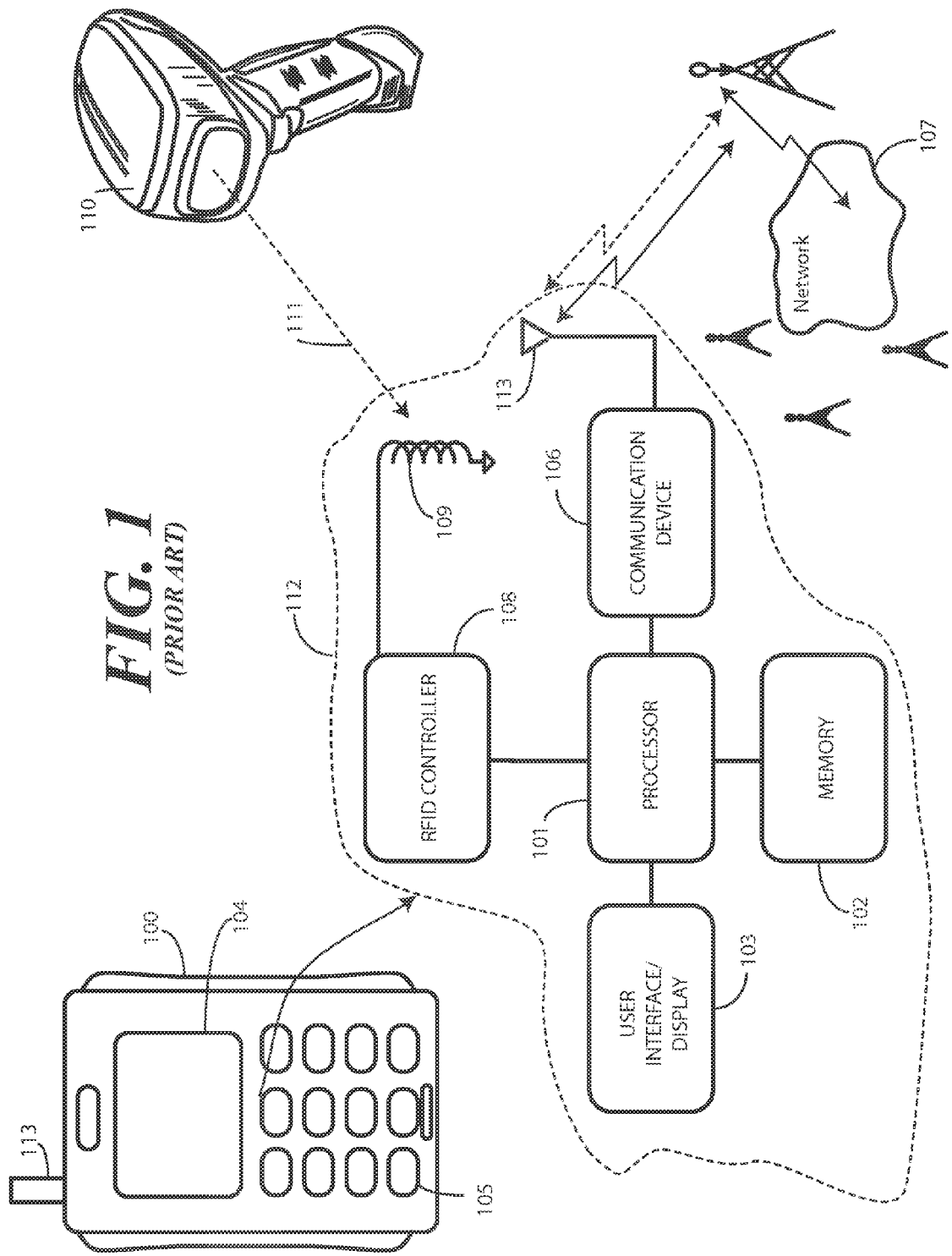
FIG. 1 illustrates a prior art electronic device having RFID communication capability.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to employing a single antenna for both wide area network communication and local, Radio Frequency Identification (RFID) communication. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of using a single antenna for both RFID and wide area network communication as described herein. The non-processor circuits may include, but are not limited to, a radio receiver, a radio transmitter, signal drivers, clock circuits, power source circuits, and user input devices. As such, these functions may be interpreted as steps of a method to perform switching and other control steps used to operate both an RFID circuit and a wide area network communication network with a single antenna. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention provide an electronic device that employs a single antenna for communication with both a communication circuit configured to communicate with at least a first network and a RFID circuit configured to communicate with a RFID communication device. The first network can be a wide area network, such as a cellular network. Alternatively, the first network can be a local area network, such as a Wi-Fi or BlueTooth.sup™ network. Of course, the communication circuit may be configured to communicate with both wide area and local area networks as well. The RFID circuit is configured to communicate with the RFID communication device in a local area.

Turning now to FIG. 1, illustrated therein is a prior art electronic device 100. The prior art electronic device 100 includes a microprocessor 101 that is operable with a memory 102 to control the functions of the prior art electronic device 100. A user interface 103 includes a display 104 and a keypad 105. A communication device 106 is configured to communicate with a wide area network 107 with an antenna 113. The wide area network 107 in this example is a cellular network.

To provide RFID communication capabilities, an RFID controller 108 is operable with a coil antenna 109. When a RFID communication device 110 interrogates the RFID controller 108, it sends RFID signals 111 to the coil antenna 109, which are then received by the RFID controller.

The circuit 112 of the prior art communication device is bulky and cumbersome in that multiple antennas must be disposed about the device. This reduces precious real estate within the housing for additional circuits that offer additional features, or for a larger battery for longer run time.

A second problem associated with packing a lot of antennas into a device, which is unexpected to many designers, involves loading. When using multiple antennas in a device, the antennas generally are spaced apart from each other to avoid electromagnetic interference. When the electronic device is a small device, such as the mobile telephone shown in FIG. 1, a user typically wraps their hand around the device and places it near their head while the device is in use. As today's mobile telephones are becoming quite small, sometimes the hand effectively envelops the device. Consequently, the antenna 113 within the prior art electronic device 100 must transmit power either through or around the hand to communicate with the network 107. The hand being placed next to the antenna 113 "loads" the antenna 113, thereby making it more difficult for the antenna to "talk" to other devices. When two antennas are in use as shown in FIG. 1, one or the other is generally always loaded when the prior art electronic device 100 is being used by a user.

Prior art designs such as the one shown in FIG. 1 deal with communication degradation by either making the antennas bigger or transmitting with more power. A larger antenna is undesirable because large antennas are not suitable for use with today's small electronic devices. Further, high operating frequencies may not be suitable for an antenna that is very long compared with its operating wavelength. Using more power is undesirable because most modern electronic devices are powered by batteries with a limited energy storage capacity. As such, an increase in transmission power means an increased load on the battery. This increased load means less "talk-time" between recharging, which can be frustrating to users of these devices.

Embodiments of the present invention provide a unique solution not found in prior art designs in that a single antenna is used for communication both with a conventional communication circuit and a RFID communication circuit. Moreover, to provide increased efficiency while in use, embodiments of the present invention employ a novel switch and switching method to control which communication circuit uses the single antenna at a given time. In one embodiment, for example, a Micro-Electromechanical (MEMS) switch is used that has a default state closed to one pole when the switch is unpowered. Accordingly, embodiments of the invention allow the switch to default to a state where the RFID communication circuit is operable with the single antenna when the device is powered OFF, and cause the switch to couple the other communication when the device is powered ON. In one or more embodiments, receipt of incoming instructions from a remote source can be used as a trigger to toggle the switch back to the RFID communication circuit for brief, momentary receipt of RFID data. User input can also be used as a trigger to cause the switch to toggle.

In one embodiment, an electronic device employs a single antenna for two communication circuits. Thus, while the electronic device may have multiple antennas, communication from a communication circuit and an RFID circuit are exclusively performed through a single antenna via a switch. The electronic device has a communication circuit to communicate with a communication network, which can be a wide area communication network, a local area network, or combinations thereof. The electronic device also has a RFID circuit to communicate with an RFID communication device. The electronic device employs a switch, which in one embodiment is a MEMS switch, to selectively couple the single antenna to one of the communication circuit or the RFID circuit so that each can use the single antenna for communication.

In one embodiment, a control circuit of the electronic device is operable to execute a method for controlling the switch. For example, in one embodiment the control circuit can couple the RFID circuit with the switch to a single antenna when the electronic device is OFF, and can then couple the communication circuit, different from the RFID circuit, with the switch to the single antenna when the electronic device is ON. When an interrupt is received, the control circuit can cause the switch to couple the single antenna to the RFID circuit. Examples of interrupts include received RFID signals from an RFID communication device and user input.

Figure 2:
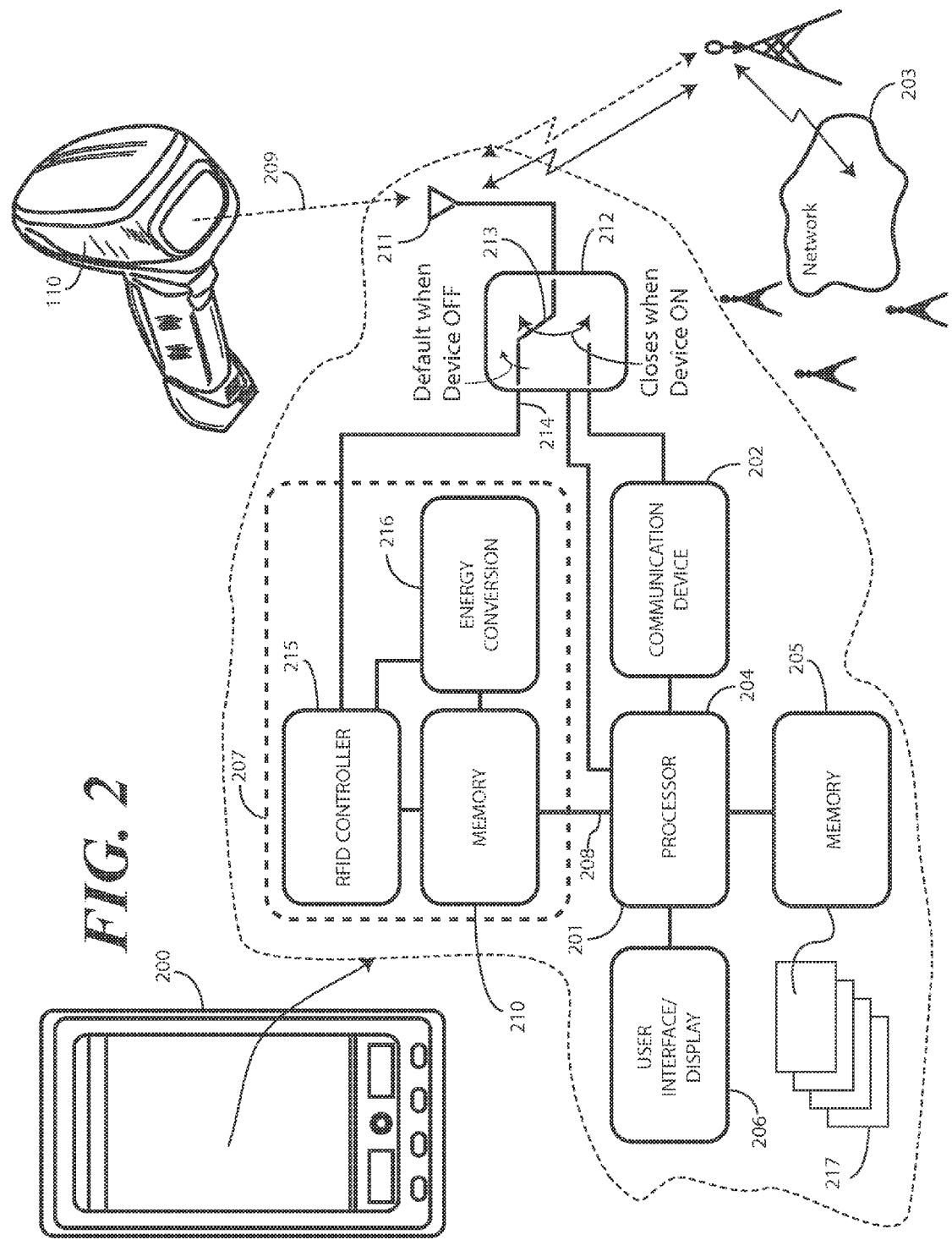
FIG. 2 illustrates one explanatory electronic device, and corresponding system, configured in accordance with one or more embodiments of the invention.

Turning now to FIG. 2, illustrated therein is an explanatory electronic device 200 configured in accordance with one or more embodiments of the invention. The illustrative electronic device 200 of FIG. 2 is shown as a smart phone for illustration. However, it will be obvious to those of ordinary skill in the art having the benefit of this disclosure that other portable electronic devices may be substituted for the explanatory smart phone of FIG. 2. For example, the electronic device 200 may be configured as a palm-top computer, a tablet computer, a gaming device, wearable computer, a media player, laptop computer, portable computer, or other device.

The explanatory electronic device 200 is shown illustratively in FIG. 2 in an operating environment, along with a schematic block diagram, incorporating explanatory embodiments of the present invention. As shown, the illustrative electronic device 200 may include standard components such as a user interface 201. The user interface 201 can include the display, which may be touch-sensitive. Alternatively, the user interface 201 can include keypads, keyboards, user input devices, voice inputs, facial feature inputs, gesture inputs, and so forth.

This illustrative electronic device 200 of FIG. 2 also includes a communication circuit 202. The communication circuit 202 can be configured for communication with one or more networks, such as the wide area network 203 shown in FIG. 2. The communication circuit 202 can also be configured to communicate with a local area network or short-range network as well. The communication circuit 202 can include wireless communication circuitry, one of a receiver, a transmitter, or transceiver, and a single antenna 211 that is used for communication with the wide area network 203. While other antennas can be present in the electronic device 200, for example for use with GPS circuits, the communication circuit 202 uses the single antenna 211 shown in FIG. 2 for data communication.

In one or more embodiments, the communication circuit 202 can be configured for data communication with at least one wide area network 203. For illustration, the wide area network 203 of FIG. 2 is shown as a cellular network being operated by a service provider. Examples of cellular networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. It should be understood that the communication circuit 202 could be configured to communicate with multiple wide area networks as well, with one being shown in FIG. 2 for simplicity. The communication circuit 202 can also be configured to communicate with a local area network (not shown), such as a Wi-Fi network being supported by a base station. Alternatively, the local area network can be via a Bluetooth.sup™ or other local area communication protocols.

In this illustrative embodiment, the electronic device 200 includes a control circuit 204, which in FIG. 2 is illustrated as one or more processors. The control circuit 204 is responsible for performing the various functions of the device. The control circuit 204 can be a microprocessor, a group of processing components, one or more Application Specific Integrated Circuits (ASICs), programmable logic, or other type of processing device. The control circuit 204 can be operable with the user interface 201 and the communication circuit 202, as well as various peripheral ports (not shown) that can be coupled to peripheral hardware devices via interface connections.

The control circuit 204 can be configured to process and execute executable software code to perform the various functions of the electronic device 200. A storage device, such as memory 205, stores the executable software code used by the control circuit 204 for device operation. The memory 205 may also store identification, configuration, and personalization information suitable for identifying the electronic device 200 or its user.

The executable software code used by the control circuit 204 can be configured as one or more modules 217 that are operable with the control circuit 204. Such modules 217 can comprise instructions, such as control algorithms, that are stored in a computer-readable medium such as the memory 205 described above. Such computer instructions can instruct processors or control circuit 204 to perform methods described below in FIGS. 6-7. In other embodiments, additional modules could be provided as needed.

The explanatory electronic device 200 of FIG. 2 includes a RFID circuit 207. The RFID circuit 207 can be integrated into the electronic device 200. In one embodiment, the RFID circuit 207 can be written to and/or read from via an external RFID communication device 110, as well as be written to and/or read from via a communication bus 208 to the control circuit 204. Accordingly, the RFID communication device 110 can read or write information to or from the RFID circuit 207 via RFID signals 209. Alternatively, the control circuit 204 can read or write information to or from the RFID circuit 207 via the communication bus 208 linking the RFID circuit 207 and the control circuit 204. Accordingly, the RFID circuit 207 can be considered a "dual-access" RFID tag since two devices, one internal and one external, can read or write to a memory 210 of the RFID tag.

In one embodiment, the RFID circuit 207 employs UHF RFID technology, which is a wireless technology that uses the 900 MHz ISM band to transmit data between the RFID communication device 110 and the RFID circuit 207. The RFID circuit 207 can be completely passive, i.e., no battery needed. Further, the read distance can be up to a few meters depending on the RF output power of the RFID communication device 110 and the design of the single antenna 211. In one embodiment, the communication protocol follows the EPCglobal's Gen-2 standard.

In the explanatory embodiment of FIG. 2, a switch 212 is used to selectively couple the single antenna 211 to one of the communication circuit 202 or the RFID circuit 207. As noted above, in one embodiment the switch 212 comprises a MEMS switch. Moreover, in one embodiment the switch 212 comprises a MEMS switch having a default, unpowered, state where the switch element 213 closes to one pole 214. In this illustrative embodiment, the switch 212 comprises a default state in which the switch element 213 defaults to a state where the RFID circuit 207 is coupled to the single antenna 211. Accordingly, when the electronic device 200 is powered OFF, the switch 212 couples the RFID circuit 207 to the single antenna 211 and decouples the communication circuit 202 from the single antenna 211. However, when the electronic device 200 is powered ON, the control circuit 204 can cause the switch 212 to couple the communication circuit 202 to the single antenna 211 instead.

MEMS switches are well suited for use as switch 212 due to the fact that they work well with high frequency data communication signals, including those associated with 3GPP GSM, 3GPP WCDMA, 3GPP LTE, 3GPP2 CDMA, UMTS, or E-UTRA networks. Further, MEMS switches can be constructed with a normally closed state coupling an output to one of two inputs when the switch 212 is in an unpowered state. Accordingly, the switch 212 can couple the RFID circuit 207 to the single antenna 211 when in the normally closed state, which in one embodiment is when the electronic device 200 is powered OFF. The switch 212 can then couple the communication circuit 202 to the single antenna 211 when the electronic device 200 is powered ON. The control circuit 204 can selectively couple the RFID circuit 207 to the single antenna 211 in response to a switch interrupt when the electronic device 200 is powered ON, as will be described below.

The single antenna 211 comprises one or more radiating elements. The single antenna's radiating elements define a radiation pattern associated therewith, which is indicative of the single antenna's effectiveness at transmitting and receiving communication signals at certain frequencies. In one embodiment, the single antenna 211 comprises a multiband folded inverted conformal antenna (FICA) antenna, which may be an internal FICA antenna disposed within a housing of the electronic device. The single antenna 211 can be formed from cut pieces of conductive metal—such as copper—capable of radiating or receiving electromagnetic energy. Other antenna structures, such as PIFA structures, may also be used in accordance with embodiments of the invention.

When in use with the RFID circuit 207, the single antenna 211 is operable with a RFID controller 215 that encodes and decodes data received from the RFID communication device 110 through the single antenna 211 for storage into, or extraction from, the memory 210 of the RFID circuit 207. In one embodiment, the memory 210 of the RFID circuit 207 is separate and distinct from the primary memory 205 of the electronic device 200.

In this illustrative embodiment, the RFID circuit 207 also includes an energy conversion device 216 that extracts power necessary to operate the RFID circuit 207 from remotely received RFID signals 209. The remote RFID communication device 110 can read to and/or write from the RFID tag while the control circuit 204 and other components of the electronic device 200 are powered OFF due to the fact that the switch 212 defaults to couple the RFID circuit 207 to the single antenna 211 when the electronic device 200 is powered OFF. The energy conversion device 216 can include a rectifier for converting a portion of the RF energy received in the form of RFID signals 209 into DC power that can be used to power both the RFID controller 215 and the memory 210 of the RFID circuit 207. The rectified power can be stored in a capacitor or other storage device of the energy conversion device 216. Once sufficient power has been accumulated from the RF signals 117, it can be amplified and provided to modulator or demodulator circuits (not shown) of the RFID circuit 207 for conversion into digital signals which can be detected and acted upon and/or stored into the memory 210 of the RFID circuit 207 by the logic of the RFID controller 215. A level shifter can provide steps in converting the RFID signals 209 to digital signals by isolating a clock from the data and providing each to the RFID controller 215. It will be obvious to those of ordinary skill in the art having the benefit of this disclosure that the RFID circuit 207 can also include any number of modulators, demodulators, charge pumps, and so forth. The RFID circuit 207 can include other elements as well, such as an impedance matching network and/or other circuitry necessary to facilitate RFID communication. While the illustrative RFID circuit 207 of FIG. 2 is shown as a passive tag having the energy conversion device 216, it should be noted that the RFID circuit 207 may alternatively be an active tag that is powered by a battery.

Advantageously, the electronic device 200 can utilize the default state of the switch 212 that couples the RFID circuit 207 to the single antenna 211 to receive data from the RFID communication device 110 while the electronic device is powered OFF. Additionally, the use of switch 212 and the RFID circuit 207 can eliminate the need to power up the electronic device 200 as a prerequisite to delivering RFID data. Moreover, the use of a single antenna 211 saves space within the electronic device 200, thereby providing more room for a bigger battery or more circuitry.

Figure 3:
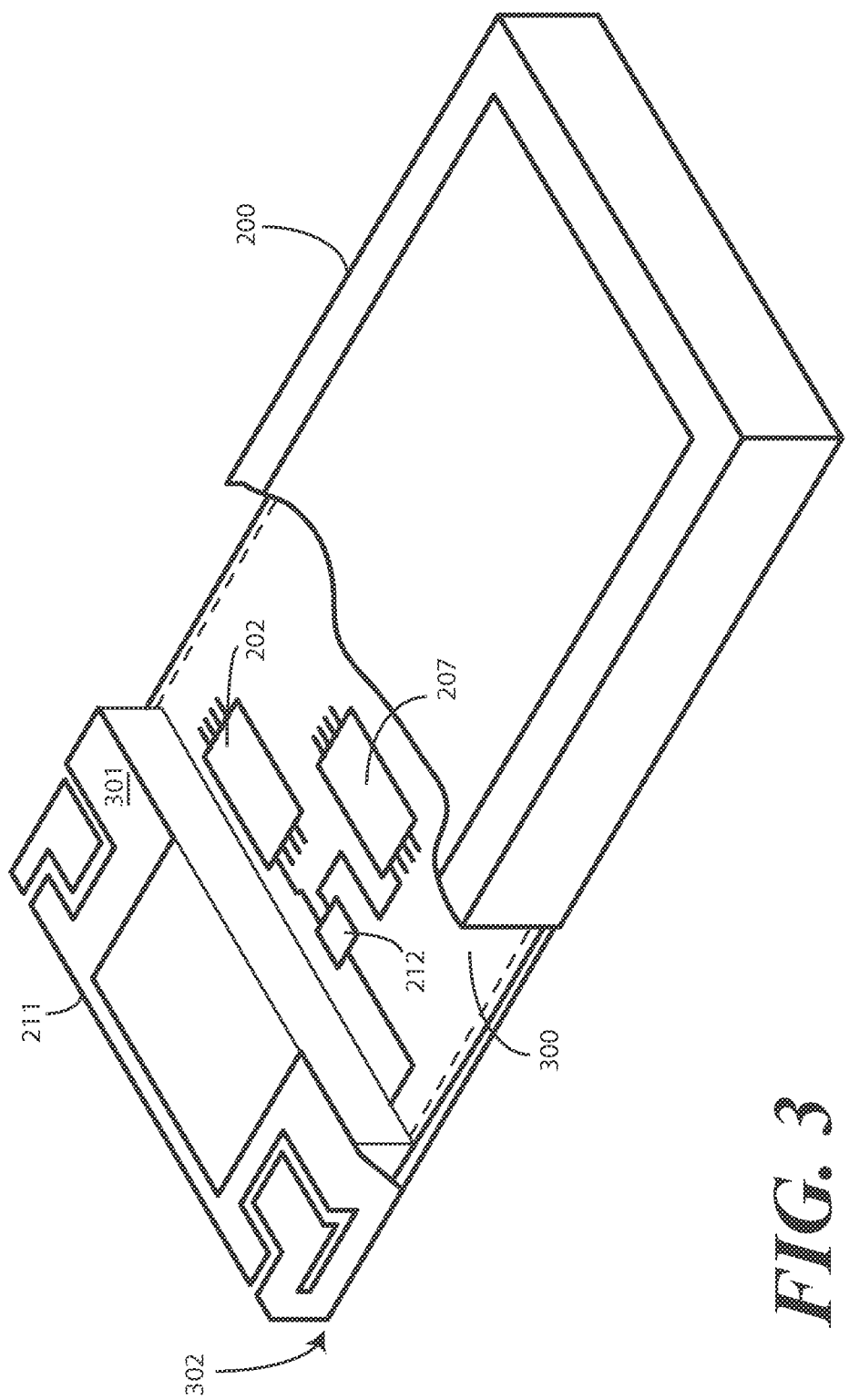
FIG. 3 illustrates a sectional view of one explanatory electronic device, revealing an antenna configured in accordance with one or more embodiments of the invention.

Turning now to FIG. 3, illustrated therein is a cut-away sectional view of the electronic device 200 of FIG. 2 that reveals one embodiment of the single antenna 211 operating with the communication circuit 202, the RFID circuit 207, and the switch 212. In this illustrative embodiment, the single antenna 211 comprises a multi-band FICA element disposed on a printed circuit board 300. The single antenna 211 can be manufactured from an electrically conductive material such as copper or aluminum.

In one embodiment, single antenna 211 includes a planar portion 301 disposed substantially parallel with the printed circuit board 300. In one embodiment, the printed circuit board 300 includes a distal end 302, and single antenna 211 is disposed at the distal end 302. Other locations within the electronic device 200 can be used as well.

Figure 4:
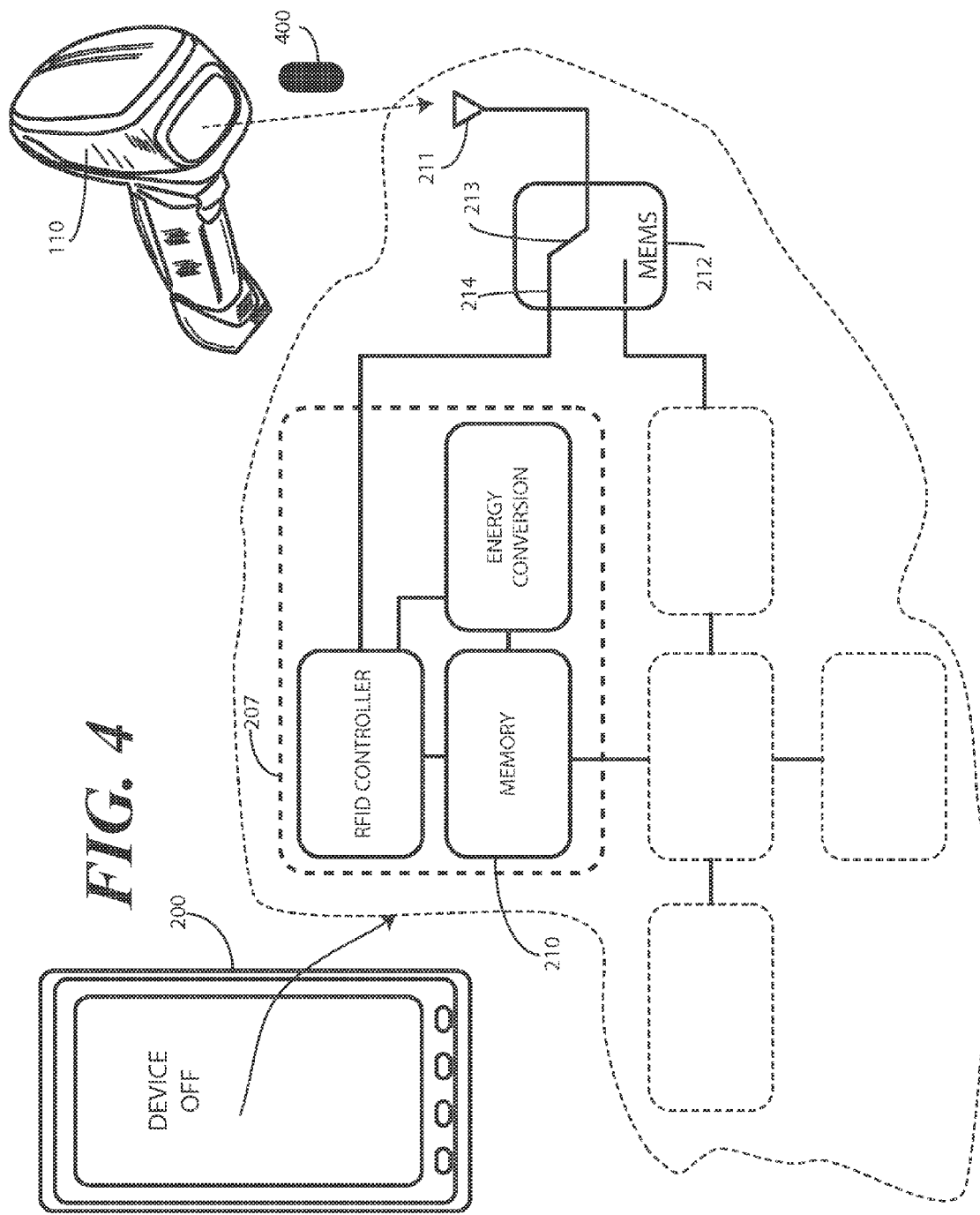
FIG. 4 illustrates one operational mode of an explanatory electronic device configured in accordance with one or more embodiments of the invention.

Turning now to FIG. 4, illustrated therein is the electronic device 200 when it is powered OFF. As shown, the switch 212 is positioned in its normally closed state that occurs when the switch is unpowered. The switch element 213 had defaulted to close to a pole 214 that couples the RFID circuit 207 to the single antenna 211. Accordingly, a RFID communication device 110 can write information 400 to the RFID circuit 207 for storage in the memory 210 of the RFID circuit 207. Alternatively, the RFID communication device 110 can read information 400 from the memory 210 of the RFID circuit 207. Each of these steps can be performed despite the fact that the control circuit (204) is not operational.

Figure 5:
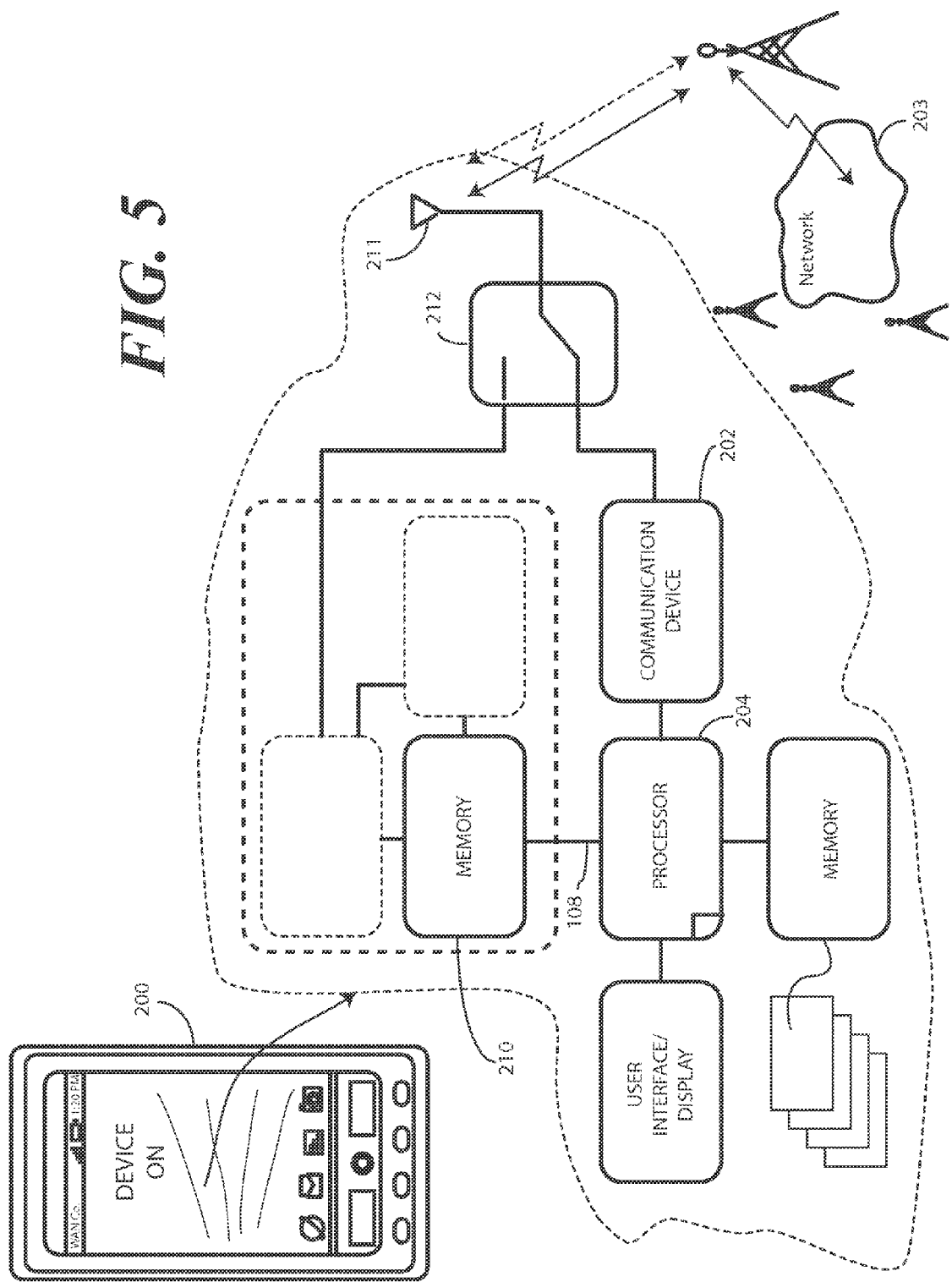
FIG. 5 illustrates another operational mode of an explanatory electronic device configured in accordance with one or more embodiments of the invention.

Turning now to FIG. 5, the electronic device 200 has now been powered ON. The control circuit 204 causes the switch 212 to couple the communication circuit 202 to the single antenna 211, thereby disconnecting the RFID circuit 207 from the single antenna 211. Accordingly, the communication circuit 202 can now communicate with a network 203 via the single antenna 211.

At the same time, the control circuit 204 can read data from the memory 210 of the RFID circuit 207 via the communication bus 208. Consequently, the control circuit 204 can retrieve any information received from a RFID communication device (110) when the electronic device 200 was powered OFF, as was the case in FIG. 4. Thus, if configuration information or other information was delivered to the memory 210 of the RFID circuit 207 when the electronic device 200 was powered OFF, it can be retrieved by the control circuit 204.

The control circuit 204 can also write to the memory 210 of the RFID circuit 207 via the communication bus 208 as well. Accordingly, if information is to be stored in the memory 210 of the RFID circuit 207, the control circuit 204 can write this information on an as needed basis. The information can later be retrieved by the RFID communication device (110).

There will, of course, be some times when the RFID circuit 207 needs to use the single antenna 211 for communication while the electronic device 200 is powered ON. To accommodate this, in one embodiment the control circuit 204 is operable to cause the switch 212 to couple the RFID circuit 207 to the single antenna 211 in response to an antenna interrupt while the electronic device 200 is ON. Examples of antenna interrupts include user input and instructions received from a remote source. Examples of each will be shown in FIGS. 6 and 7.

Figure 6:
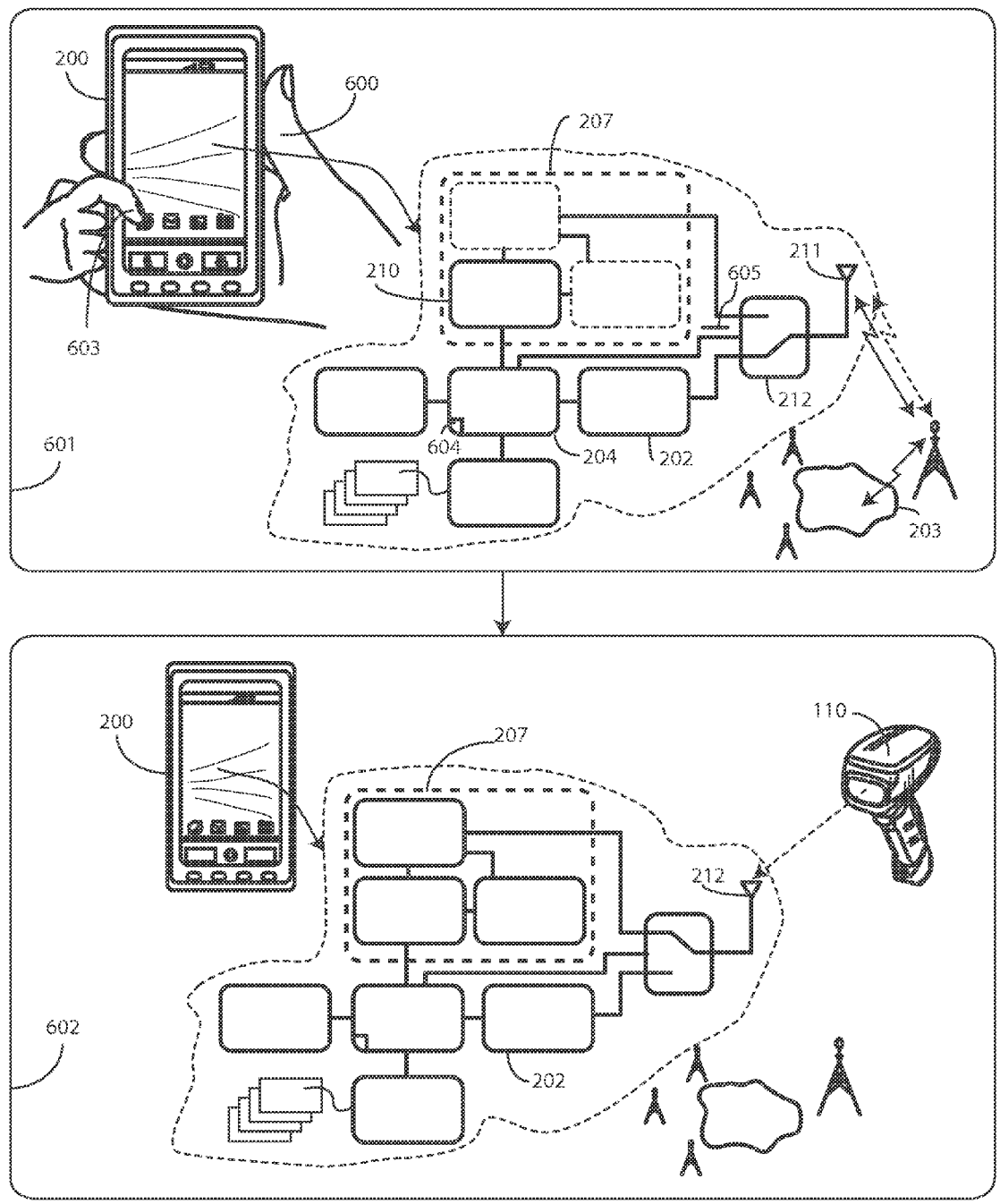
FIG. 6 illustrates a method of operating an explanatory electronic device configured in accordance with one or more embodiments of the invention.

Beginning with FIG. 6, the electronic device 200 is powered ON at step 601. The control circuit 204 causes the switch 212 to couple the communication circuit 202 to the single antenna 211, thereby disconnecting the RFID circuit 207 from the single antenna 211. Accordingly, the communication circuit 202 can now communicate with a network 203 via the single antenna 211.

A user 600 then desires to use RFID for communication. This can occur for any of a variety of reasons. One example is that the user 600 may want to write configuration information to the memory 210 of the RFID circuit 207 with a RFID communication device 110.

The user 600 therefore provides user input 603 to the electronic device 200. In one embodiment, the user input 603 is a predefined input, such as a particular gesture, actuation of a particular user actuation target, or entry of a special code. The user input 603 causes an antenna interrupt 604 at the control circuit 204. This causes the control circuit 204 to deliver a switch interrupt 605 to the switch 212 to cause the switch 212 to couple the RFID circuit 207 to the single antenna 211 as shown at step 602. As shown at this step 602, the switch 212 couples the RFID circuit 207 to the single antenna 211. Accordingly, a RFID communication device 110 can write information to the RFID circuit 207 for storage in the memory 210 of the RFID circuit 207. Alternatively, the RFID communication device 110 can read information from the memory 210 of the RFID circuit 207.

Since it is anticipated that the read and/or write operations from the RFID communication device 110 will be of short duration, and will further be seldom used when the electronic device 200 is operational, in one embodiment, when the control circuit 204 causes the switch 212 to couple the RFID circuit 207 to the single antenna 211 when the electronic device 200 is powered ON, it does so for less than a predefined duration. Illustrating by example, in one embodiment the predefined duration is less than 100 milliseconds. This duration can be measured with a timer. During this predefined duration, the RFID circuit 207 can receive information from the RFID communication device 110. Once the predefined duration expires, the switch 212 can recouple the communication circuit 202 to the single antenna 211 as shown at step 601. In other embodiments, a second user input or other instruction can cause the switch 212 to reconnect the communication circuit 202 to the single antenna 211.

Figure 7:
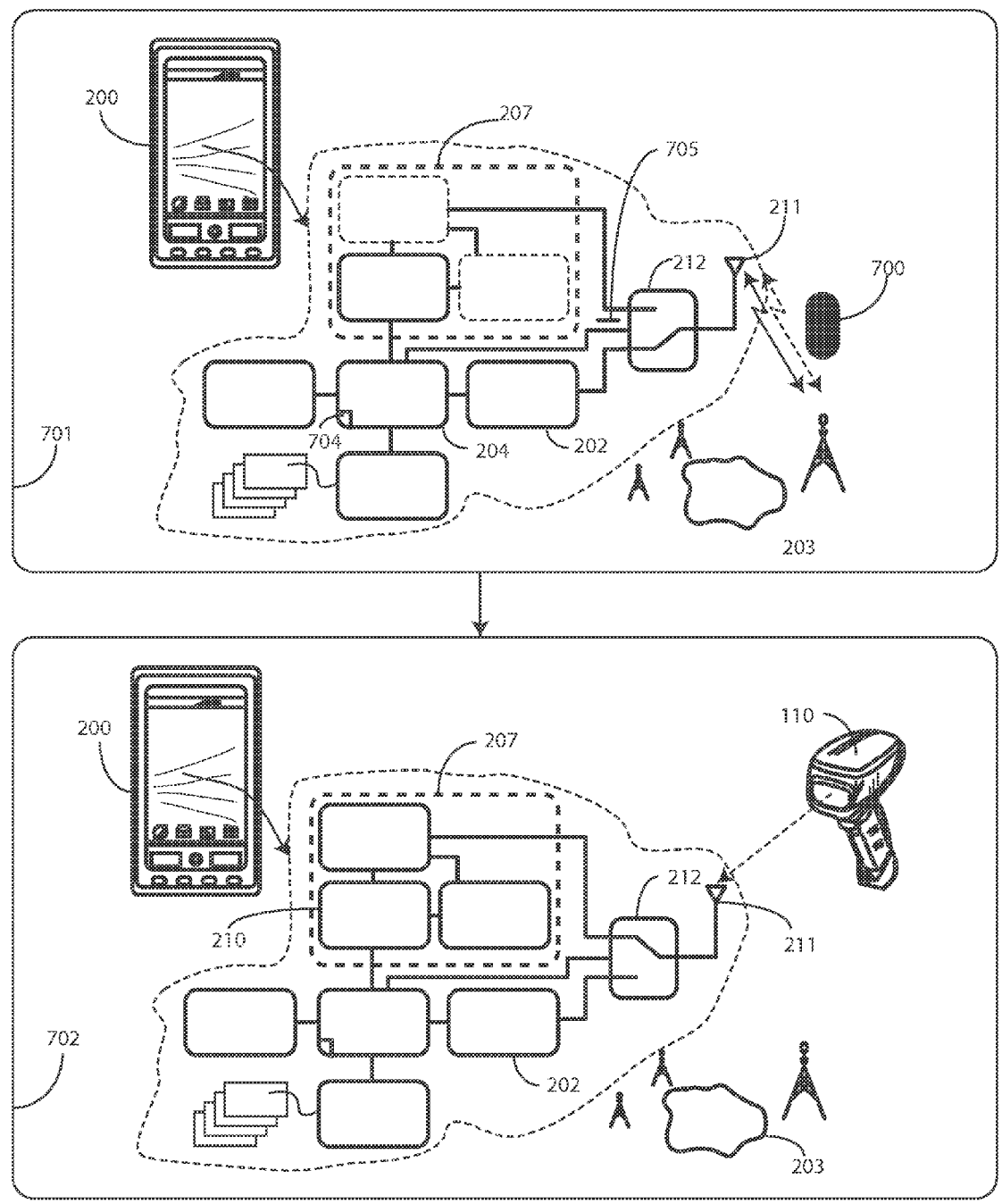
FIG. 7 illustrates another method of operating an explanatory electronic device configured in accordance with one or more embodiments of the invention.

Turning now to FIG. 7, another method of controlling the switch 212 is shown. In some cases, rather than a user designating that the RFID circuit 207 should be used, a remote source may deliver an instruction 700 to the electronic device 200 that causes the switch 212 to switch from the communication circuit 202 to the RFID circuit 207. In one illustrative example, a cellular carrier may want to give a merchant selling the electronic device 200 the opportunity to personalize or otherwise configure the electronic device 200 with a RFID communication device 110. Accordingly, the cellular carrier may send an instruction 700 that causes the switch 212 to toggle. In one or more embodiments, the instruction 700 may cause the switch 212 to toggle for less than a predetermined duration, such as about 100 milliseconds.

As shown at step 701, the electronic device 200 is powered ON. The control circuit 204 causes the switch 212 to couple the communication circuit 202 to the single antenna 211, thereby disconnecting the RFID circuit 207 from the single antenna 211. Accordingly, the communication circuit 202 can now communicate with a network 203 via the single antenna 211.

The instruction 700 is then received by the communication circuit 202 from a remote source across the network 203. As noted above, the remote source may be a service provider. The instruction 700 is delivered to the control circuit 204. The instruction 700 causes an antenna interrupt 704 at the control circuit 204. This causes the control circuit 204 to deliver a switch interrupt 705 to the switch 212 to cause the switch 212 to couple the RFID circuit 207 to the single antenna 211 as shown at step 702. As shown at this step 702, the switch 212 couples the RFID circuit 207 to the single antenna 211. Accordingly, a RFID communication device 110 can write information to the RFID circuit 207 for storage in the memory 210 of the RFID circuit 207. Alternatively, the RFID communication device 110 can read information from the memory 210 of the RFID circuit 207. As with the method of FIG. 6, when the control circuit 204 can cause the switch 212 to couple the RFID circuit 207 to the single antenna 211 for less than a predefined duration in response to the instruction 700. Once the predefined duration expires, the switch 212 can recouple the communication circuit 202 to the single antenna 211 as shown at step 701. In other embodiments, a second instruction received from the network can cause the switch 212 to reconnect the communication circuit 202 to the single antenna 211.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a communication circuit to communicate with at least one of a wide area network and a local area network;
    an RFID circuit to communicate with an RFID communication device; and
    a switch to couple, by default, the RFID circuit to a single antenna when the electronic device is powered off and couple the communication circuit to the single antenna when the electronic device is powered on.

2. The electronic device of claim 1, the switch comprising a MEMS switch.

3. The electronic device of claim 1, the switch comprising a normally closed state coupling an output to one of two inputs when the switch is in an unpowered state.

4. The electronic device of claim 3, the switch to couple the RFID circuit to the single antenna when in the normally closed state.

5. The electronic device claim 1, the electronic device further comprising a control circuit, operable with the switch, to couple the RFID circuit to the single antenna in response to a switch interrupt when the electronic device is ON.

6. The electronic device of claim 5, the control circuit to couple the RFID circuit to the single antenna in response to the switch interrupt for a duration less than 100 milliseconds.

7. The electronic device of claim 5, the switch interrupt comprising a predefined user input.

8. The electronic device of claim 5, the switch interrupt comprising an instruction received from the communication network.

9. The electronic device of claim 1, the communication network comprising a wide area network.

10. The electronic device of claim 9, the wide area network comprising one of a 3GPP GSM, 3GPP WCDMA, 3GPP LTE, 3GPP2 CDMA, UMTS, or E-UTRA network.

11. The electronic device of claim 1, the single antenna comprising a multiband folded inverted conformal antenna.

12. The electronic device of claim 1, the RFID circuit comprising an energy conversion device that extracts power from received RFID signals to operate the RFID circuit when the device is powered OFF.

13. A method of operating an electronic device, comprising:
    coupling, by default, an RFID circuit with a switch to a single antenna when the electronic device is powered OFF; and
    coupling a communication circuit, different from the RFID circuit, with the switch to the single antenna when the electronic device is powered ON, wherein the communication circuit is configured to communicate with at least one of a wide area network and a local area network.

14. The method of claim 13, further comprising:
while the electronic device is ON, coupling the RFID circuit with the switch to the single antenna in response to an antenna interrupt.

15. The method of claim 14, the antenna interrupt comprising user input.

16. The method of claim 14, the antenna interrupt comprising an instruction received with the communication circuit from a remote source.

17. The method of claim 14, the coupling the RFID circuit to the single antenna in response to the antenna interrupt occurring for less than a predefined duration.

18. The method of claim 14, further comprising receiving RFID information from an RFID communication device with the RFID circuit.

19. The method of claim 13, further comprising receiving RFID information from an RFID communication device with the RFID circuit when the electronic device is OFF.

20. The method of claim 13, further comprising extracting power from received RFID signals to operate the RFID circuit when the device is powered OFF.

\* \* \* \* \*